Patented Aug. 11, 1936

2,050,913

UNITED STATES PATENT OFFICE 2,050,913

AZO-DYESTUFFS AND PROCESS OF MAKING SAME

Walter Anderau, Basel, Switzerland, assignor to the firm of Society of Chemical Industry in Basle, Basel, Switzerland No Drawing. Application April 2, 1936, Serial No. 72,437. In Switzerland April 18, 1935

4 Claims. (Cl. 260—70)

This invention consists in the manufacture of azo-dyestuffs by combining 2 mols. of a diazo-compound of an amino-azo-dyestuff of the general formula

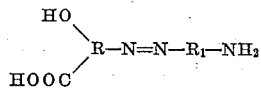

wherein R and $R_1$ represent unsulfonated aryl residues and the OH- and COOH-groups in the aryl residue R are in ortho-position to one another, with 1 mol. of 5,5'-dihydroxy-2,2'-dinaphthyl-amine-7,7'-disulfonic acid.

The amino-azo-dyestuffs of the above general formula can be made from various unsulfonated amines of the benzene and naphthalene series; the amine from which the aryl residue R is derived must, however, fulfil the condition that it contains the salicylic acid grouping. Suitable amines are, on the one hand, amino-salicylic acids and, on the other hand, aniline, naphthylamines, aminophenols, aminonaphthols, alkoxy-anilines, alkoxynaphthylamines, aminobenzene-carboxylic acids and aminonaphthalene-carboxylic acids; these bodies may contain further substituents, for instance halogen or nitro- or alkyl-groups, such as methyl- or ethyl-groups.

The coupling of the diazotized amino-azo-dyestuffs with 5,5'-dihydroxy-2,2'-dinaphthylamine-7,7'-disulfonic acid is performed in the usual manner in an alkaline medium; the alkalinity of the medium may be due for instance to sodium carbonate, sodium bicarbonate or ammonia.

The dyestuffs obtainable by the invention dye cellulosic and vegetable fibers, such as cotton and artificial silk from regenerated cellulose, blue tints; dyeings particularly valuable in respect of their properties of fastness, especially fastness to washing are obtained by treating the dyeings with agents that yield metal, for instance chromium, coller, iron cobalt, nickel, manganese, zinc, vanadium or titanium.

The following examples illustrate the invention the parts being by weight:—

Example 1

The amino-azo-compound from 153 parts of 4-amino-1-hydroxy-benzene-2-carboxylic acid and 137 parts of 1-amino-2-methoxy-5-methylbenzene is diazotized by means of 250 parts of hydrochloric acid and 70 parts of sodium nitrite and the diazo-solution is coupled, in presence of 600 parts of sodium carbonate, with a solution of 462 parts of 5,5'-dihydroxy-7,7'-disulfo-2,2'-dinaphthylamine at 0° C. The whole is then further coupled with the diazo-compound of the amino-azo-compound, which is obtainable from 153 parts of 4-amino-1-hydroxybenzene-2-carboxylic acid by coupling in acid solution with 153 parts of 1-amino-2,5-dimethoxy-benzene.

The tetrakisazo-dyestuff thus formed has the formula

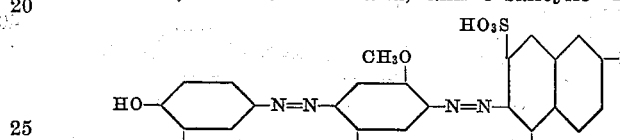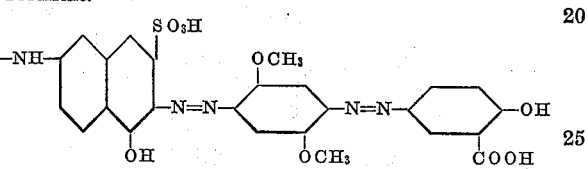

It is separated by addition of common salt. It dissolves in water and dilute alkalies to blue solutions and in concentrated sulfuric acid also to a blue solution. It dyes cotton or viscose in a bath containing sodium carbonate and Glauber's salt blue tints which become fast to light and washing after treatment with copper salts.

Example 2

154 parts of 4-amino-1-hydroxybenzene-2-carboxylic acid are diazotized and coupled in feebly acid solution, in presence of sodium acetate, with a fine suspension of 153 parts of 1-amino-2,5-dimethoxy-benzene. The aminoazo-dyestuff thus obtained is filtered, suspended in water and diazotized with 250 parts of hydrochloric acid and 70 parts of sodium nitrite and then coupled in presence of 400 parts of sodium carbonate with a solution of 230 parts of 5,5'-dihydroxy-7,7'-disulfo-2,2'-dinaphthylamine. By salting out there is obtained the tetrakisazo-dyestuff which has the formula

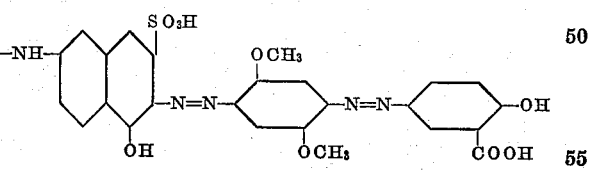

It is filtered and dried.

The dyestuff is a dark bronze powder, soluble in water and in dilute alkali to a blue solution and in concentrated sulfuric acid to a blue green solution. It dyes cellulosic fibres, such as cotton and artificial silk from regenerated cellulose, in a bath containing sodium carbonate and Glauber's salt, blue tints. By after-treatment with copper salts the dyeings become fast to washing and to light without essential variation of the tint.

Example 3

154 parts of 4-amino-1-hydroxybenzene-2-carboxylic acid are diazotized with 250 parts of hydrochloric acid and 70 parts of sodium nitrite and coupled in feebly acid solution with 137 parts of 1-amino-2-methoxy-5-methylbenzene, the free mineral acid being buffered with sodium formate. The aminoazo-dyestuff thus formed is filtered, suspended in water and diazotized with 250 parts of hydrochloric acid and 70 parts of sodium nitrite. The diazo-compound is coupled in presence of 400 parts of sodium carbonate with a solution of 230 parts of 5,5'-dihydroxy-7,7'-disulfo-2,2'-dinaphthylamine. The whole is stirred for some time at 0-4° C. The dyestuff which has the formula

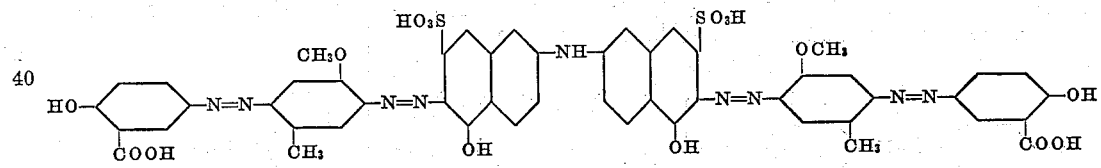

is salted out, filtered and dried. It is then a blackish bronze powder, soluble in water and in dilute alkalies to a blue solution and in concentrated sulfuric acid to a green-blue solution. It dyes cotton and artificial silk from regenerated cellulose in a bath containing sodium carbonate and Glauber's salt blue tints which become thoroughly fast to light and washing by after-treatment with solutions of copper salts.

Example 4

154 parts of 4-amino-1-hydroxybenzene-2-carboxylic acid are diazotized and coupled in the presence of sodium acetate, that is to say in a faintly acid medium, with 143 parts of 1-amino-naphthalene. When coupling is finished the aminoazo-dyestuff thus formed is isolated and dissolved in water with the aid of 80 parts of caustic soda. 70 parts of sodium nitrite are added and the solution is allowed to run into a mixture of ice and hydrochloric acid, whereby diazotization occurs; it is completed after stirring for about 1 hour.

The diazonium compound thus obtained is coupled in the presence of sodium carbonate with 230 parts of 5,5'-dihydroxy-7,7'-disulfo-2,2'-dinaphthylamine whereby there is formed a tetrakisazo-dyestuff which has the formula

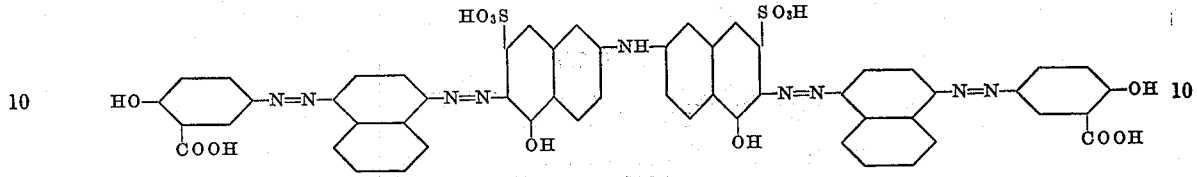

When coupling is finished the precipitation of the dyestuff is completed by addition of common salt and the dyestuff is filtered and dried. It is a blackish powder having a bronze lustre and is soluble in water and dilute alkalies to blue solutions and in concentrated sulfuric acid to a blue-green solution. It dyes cotton in a bath containing sodium carbonate and Glauber's salt blue tints which become fast to washing and to light when after-treated with copper sulfate.

What I claim is:—

1. Process for the manufacture of azo-dyestuffs, consisting in coupling 2 moles of the diazo-compounds of an aminoazo-dyestuff of the general formula

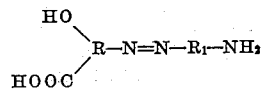

wherein R and R₁ represent unsulfonated arylene radicals selected from the group consisting of phenylene and naphthylene, and wherein the OH-group and the carboxyl-group of the arylene radical R stand in ortho-position to one another, with 1 mole of 5,5'-dihydroxy-2,2'-dinaphthylamine-7,7'-disulfonic acid.

2. Process for the manufacture of an azo-dyestuff, consisting in coupling 2 moles of the diazo-compound of the aminoazo-dyestuff of the formula

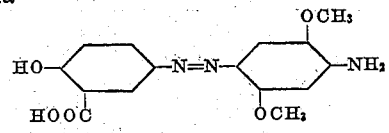

with 1 mole of 5,5'-dihydroxy-2,2'-dinaphthylamine-7,7'-disulfonic acid.

3. Azo-dyestuffs of the general formula

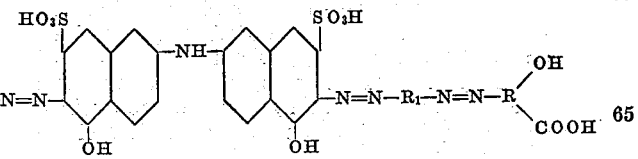

wherein R and R₁ represent unsulfonated arylene radicals selected from the group consisting of phenylene and naphthylene and wherein the OH-group and the carboxyl-group of the arylene radical R stand in ortho-position to one another, which products are dark colored powders, dissolving in water and dilute alkalies to blue solutions, in concentrated sulfuric acid to blue to blue-green solutions, and dyeing vegetable fibers blue tints which when after-treated with copper compounds becomes fast to light and washing.

4. The azo-dyestuff of the formula

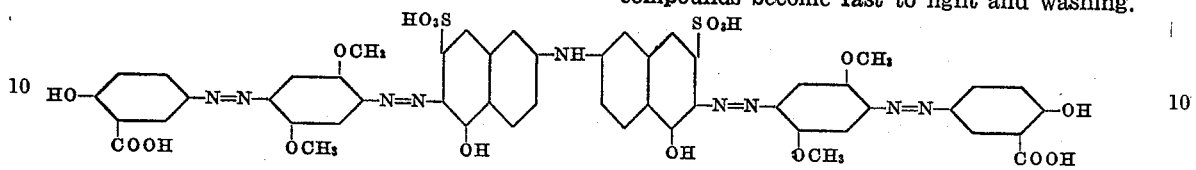

which product is a dark colored powder, dissolving in water and dilute alkalies to a blue solution, in concentrated sulfuric acid to a blue-green solution, and dyeing vegetable fibers blue tints which when after-treated with copper compounds become fast to light and washing.

WALTER ANDERAU.